G. A. PADDOCK.
CLOTHES WRINGER.
APPLICATION FILED SEPT. 11, 1915.
1,295,580. Patented Feb. 25, 1919.
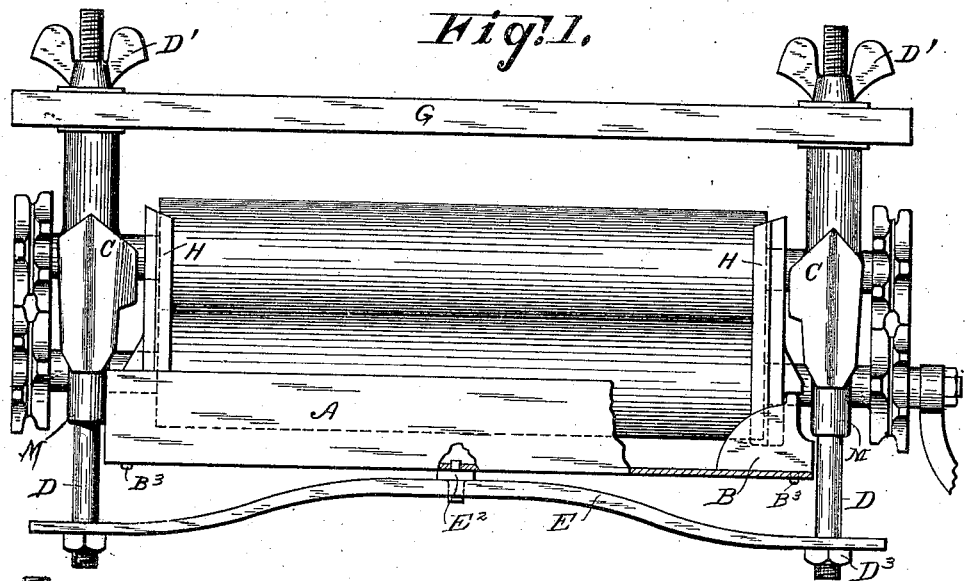
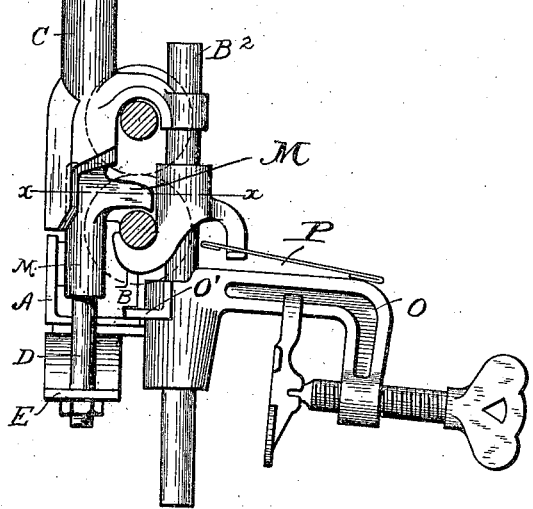
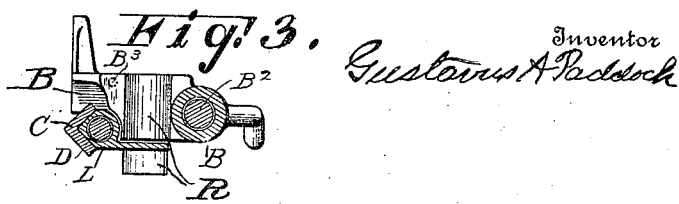
Witnesses
Inventor
Gustavus A Paddock

UNITED STATES PATENT OFFICE.

GUSTAVUS A. PADDOCK, OF BEAVER DAM, WISCONSIN.

CLOTHES-WRINGER.

1,295,580. Specification of Letters Patent. Patented Feb. 25, 1919.

Application filed September 11, 1915. Serial No. 50,276.

*To all whom it may concern:*

Be it known that I, GUSTAVUS A. PADDOCK, a citizen of the United States, residing at Beaver Dam, in the county of Dodge and State of Wisconsin, have invented a new and useful Improvement in Clothes-Wringers, of which the following is a specification.

In the accompanying drawing:

Figure 1 is a front view of my improved wringer.

Fig. 2 is a view of one end thereof, the gear wheels being removed.

Fig. 3 is a top view on the line X X, in Fig. 2.

A is a cross bar made of angle steel and B B the lower roll shaft bearings, resting on said bar and prevented from slipping by small pins $B^3$ integral therewith, which rest in holes in the bar.

Rods, $B^2$, integral with said bearings, extend downward, their lower ends being adapted to rest against the inside of the tub, and coöperate with the clamps O to hold the wringer in position thereon.

Clamps, O, are pivoted on said rods, and flanges, $O^1$, integral with said clamps, rest over the ends of the cross bar and prevent their falling off.

The rods $B^2$ also extend upward, and upper roll shaft bearings, C, C, are slidingly mounted thereon and provided with sleeves in which are slidingly received bolts, D, D, which reach down through holes in a spring E, and are provided with nuts $D^3$ at their lower ends.

A small block, $E^2$ lies between the spring and cross bar A, to hold the former in position. Small pins $B^3$, integral with the lower roll shaft bearings rest in holes in the bar A, and prevent the bearings from slipping out of place.

Hooks, M, M, integral with said bolts, project over the lower roll shaft, R, and when said nuts $D^3$ are tightened, the spring is kept in tension and the bearings B are held firmly, yet yieldingly on the bar A. This latter point is important, as the roll bearings are most suitably made of gray iron and if bolted solidly to the bar they would be in far more danger of breakage. Said bolts also extend upwardly through a cross bar, G.

Thumb nuts, $D^1$, above said bar furnish means for bringing pressure on the upper roll shaft.

P is a clothes apron secured to projections of the bearings B.

H, H, are end guards adapted to prevent the clothes from slipping out at the ends.

By the above described construction, the frame being elastic can be lightly yet safely made, and as the spring is always in tension, little turning of the thumb nuts is needed to tighten the rolls.

In this construction roll pressure is applied, the clamps are secured, the spring kept in constant tension, and the whole wringer yieldingly secured together in the very safest manner, all by two bolts.

I claim as my invention:

1. A clothes wringer comprising lower roll shaft bearings resting on a connecting cross bar, upright rods projecting upward therefrom, upper roll shaft bearings slidingly mounted on said rods, a spring lying under said bar, bolts connecting said spring with said upper bearings, and projections secured to said bolts and adapted to hold said cross bar and the lower bearings together when the upper bearings are released.

2. A clothes wringer comprising lower roll shaft bearings resting on a connecting cross bar, a spring lying under said bar, an upper cross bar, bolts passing through said spring and through said upper cross bar, and adjusting nuts at each end of said bolts.

3. A clothes wringer comprising a pair of rolls with suitable bearings, a connecting cross bar on which the lower bearings rest, a flat spring lying under and with its central part pressing upward against said bar, means in connection with said spring for applying and releasing roll pressure, and adjustable means for holding the spring in tension when the roll pressure is released.

4. A clothes wringer comprising a pair of rolls with suitable bearings, a connecting cross bar on which the lower bearings rest, a spring lying under said bar, and with its central part pressing against said bar, and means in connection with said spring and rolls for supplying adjustable roll pressure, and also for releasing the same while the spring remains in tension.

5. A clothes wringer comprising a cross bar, a flat spring with its center bringing pressure against said bar, upper and lower rolls, means connecting said spring and rolls for applying and releasing roll pressure, roll shaft bearings pressing against the ends of said bar, and suitable means for continuing pressure of the spring against the bar when the roll pressure is removed.

6. A clothes wringer comprising lower roll shaft bearings resting on a connecting cross bar, rods rising from said bearings and supporting upper roll shaft bearings, said rods adapted to project down inside a tub, clamps pivoted on said rods and provided with flanges which rest on said cross bar thereby preventing the clamps from falling off.

7. A clothes wringer comprising a connecting cross bar with a hole in each end, lower roll shaft bearings resting on said bar, pins integral with said bearings and adapted to rest in said holes, and means to hold said bearings and bar yieldingly together.

8. A clothes wringer comprising a pair of rolls in suitable bearings, upright rods integral with the lower bearings and adapted to project down into a tub, with part of their length resting directly against the tub, clamps pivoted on said rods, a spring substantially parallel with the rolls, means connecting said rolls and spring for furnishing roll pressure, the bearing for the upper roll being slidingly mounted on said rods, and means for releasing roll pressure while the spring remains in tension.

9. A clothes wringer comprising a connecting cross bar, lower roll shaft bearings resting on said bar, and means to hold said bearings yieldingly on said bar, thereby being adapted to prevent breakage.

GUSTAVUS A. PADDOCK.

Witnesses:
H. M. Mason,
E. S. Mason.

Copies of this patent may be obtained for five cents each, by addressing the "Commissioner of Patents, Washington, D. C."